United States Patent [19]

Kemmner

[11] Patent Number: 5,158,411

[45] Date of Patent: Oct. 27, 1992

[54] SEED PLANTING DEVICE

[75] Inventor: Hartmut Kemmner, Unteren Singen, Fed. Rep. of Germany

[73] Assignee: Kuhn S.A., Saverne, France

[21] Appl. No.: 533,795

[22] Filed: Jun. 6, 1990

[30] Foreign Application Priority Data

Jun. 6, 1989 [FR] France .................... 89 07630

[51] Int. Cl.⁵ .................... A01C 5/04; A01C 7/20
[52] U.S. Cl. .................... 111/131; 111/161; 111/159; 111/144
[58] Field of Search ............ 111/139, 144, 140, 145, 111/200, 131, 132, 133, 159, 161, 162

[56] References Cited

U.S. PATENT DOCUMENTS

| | | | |
|---|---|---|---|
| 1,847,327 | 3/1932 | Bateman | 111/144 X |
| 2,690,145 | 9/1954 | Romain | 111/161 X |
| 3,139,049 | 6/1964 | Brown | 111/131 |
| 3,319,590 | 5/1967 | Zimmerman | 111/85 |
| 3,398,707 | 8/1968 | McClenny | 111/144 |
| 3,888,196 | 6/1975 | Glenn | 111/162 X |
| 4,324,295 | 4/1982 | Weichel | 111/161 X |

FOREIGN PATENT DOCUMENTS

| | | |
|---|---|---|
| 66749 | 1/1893 | Fed. Rep. of Germany . |
| 346410 | 12/1921 | Fed. Rep. of Germany . |
| 3337178 | 4/1985 | Fed. Rep. of Germany ...... 111/133 |
| 3624784 | 1/1988 | Fed. Rep. of Germany . |
| 760974 | 12/1933 | France . |
| 2388478 | 11/1978 | France . |
| 257180 | 11/1969 | U.S.S.R. .................... 111/161 |

Primary Examiner—Randolph A. Reese
Assistant Examiner—Jeffrey L. Thompson
Attorney, Agent, or Firm—Oblon, Spivak, McCleland, Maier & Neustadt

[57] ABSTRACT

An improved device for planting seed in the soil, a sowing machine and combined machine for preparing a seedbed and for sowing using the device. According to the invention, an outside part of active part of a tool is provided which includes a carrying element whose outside edge is directed essentially crosswise to the direction of advance during working operation.

80 Claims, 6 Drawing Sheets

SEED PLANTING DEVICE

BACKGROUND OF THE INVENTION

1. Field of the Invention

This invention relates to a device for planting seed in the soil prevented with at least one element for planting seed in the soil which includes a carrying structure; a rotary element rotatably guided on the carrying structure so as to rotate around an axis of rotation which extends crosswise to the direction of advance during working operation, the rotary element including a central support and tools attached to the central support in at least one ring at least substantially radial with respect to the axis of rotation of the rotary element; and a pipe for guiding and planting seed in the soil extending in front of the central support of the rotary element and passing, during working operation, in the vicinity of the corresponding lateral edge of the respective tools of the rotary element, each of the tools comprising an active part, whose outside part at least extends, when viewed along the axis of rotation of the rotary element and taking into account the direction of rotation of the rotary element, in front of a plane containing the axis of rotation and resting at least approximately on the outside edge of the tool.

DISCUSSION OF THE BACKGROUND

A known device for planting seed in the soil comprises a carrying structure which supports a rotary element made in the form of a roller and pipes for guiding and planting seed in the soil. The roller is guided in rotation in the carrying structure so as to be able to rotate around its longitudinal axis which extends at least approximately perpendicular to the direction of advance during working operation. It comprises a central support to which are attached tools arranged in radial rings spaced along the central support. Each tool is made in the form of a tooth, whose attachment portion extends radially relative to the central support and whose outside portion is bent rearward, taking into account the direction of rotation. In this manner, each tooth extends, taking into account the direction of rotation, entirely in front of a plane containing the axis of rotation of the roller and resting on its outside end made in the form of a point. The pipes for guiding and planting seed in the soil are arranged at approximately constant intervals in a row extending at least approximately parallel to the longitudinal axis of the roller. The pipes are each connected to the carrying structure by a joint with a pin directed at least approximately parallel to the longitudinal axis of the roller. The pivoting rearward action, around the pin of their corresponding joint, is performed in opposition to a spring. Moreover, each pipe for guiding and planting seed in the soil extends in front of the central support of the roller and passes, during working operation, at least close to the lateral edges of the corresponding teeth of the roller. Control of the working depth of this known device for planting seed in the soil is assured by an additional roller, of the cage type, which supports the carrying structure of the device.

This known device for planting seed in the soil offers a substantial advantage. Actually, as each pipe for guiding and planting seed in the soil passes, during working operation, at least close to the lateral edges of the corresponding teeth of the roller, the latter continually clean the pipe and thereby prevent, when the device is called on to operate in a field covered by plant residues, the latter from remaining hooked on the pipe. Likewise, the teeth also prevent, in sticky earth, accumulations of earth from being formed between two adjacent pipes for guiding and planting seed in the soil.

In practice, it has been proven that some plant residues, particularly the corn leaves found in the field after a corn harvest, were pierced by the teeth and thus remain hooked to the teeth. Likewise, it has been proven that in some soils favorable to the formation of compact clumps, the clumps also were pierced by the teeth and remained stuck to the latter.

Moreover, it appeared that the control of the working depth of the known device was not optimal.

SUMMARY OF THE INVENTION

The object of this invention comprises solving the problems of the known device while maintaining its advantages.

For this purpose, the device for planting seed in the soil according to the invention is characterized by the fact that at least the outside part of the active part of the tool comprises a carrying element, whose outside edge is directed essentially crosswise to the direction of advance during working operation.

Thanks to this characteristic, each tool of the rotary element assures the bearing capacity of the device for planting seed in the soil when its carrying element is in contact with the soil. Thus, the working depth of the device for planting seed in the soil is controlled by the rotary element of the device. Control is thus assured in an optimal manner since it is achieved in the very vicinity, even slightly in front, of the zone where the pipe for guiding and planting seed places the seed in the soil.

Since, in addition, the outside edge of the carrying element of each tool of the rotary element is directed essentially crosswise to the direction of advancement during working, the tool is prevented from piercing plant debris and/or the clumps of earth and drives the latter during its rotation.

Further, it has been proven that these tools also assure good covering of the seed planted in the soil by the pipe for guiding and planting seed. Actually, on the level of the surface of the soil, the carrying element of each tool slightly penetrates the soil. Now, as the carrying element has a certain width in a direction crosswise to the direction of advance during working operation, it will lift a certain amount of earth when it is raised out of the soil after the pipe for guiding and planting seed has deposited seed in the soil. As soon as being lifted, this amount of earth will drop, closing in particular the furrow made by the pipe and thus assuring covering of the seed which was just planted.

Advantageously, the axis of rotation of the rotary element extends at least approximately perpendicular to the direction of advance during working operation.

According to an additional characteristic of the invention, the outside edge of the carrying element of the tool is directed at least approximately horizontally and at least approximately perpendicular to the direction of advance during working operation.

Preferably, it even will be provided that the outside edge is at least approximately straight.

According to an additional characteristic of the invention, it also is provided that, as viewed along the axis of rotation of the rotary element, the outside part of the active part of the tool forms, with the plane containing the axis of rotation and resting at least approximately on the outside edge of the carrying element of the latter, an angle $\beta 1$ of a value of between 15° and 45°. Advantageously, the outside part of the active part of the tool is, as viewed along the axis of rotation of the rotary element, at least approximately vertical.

Also advantageously, the length of this at least approximately straight outside part is approximately between one fourth and one third of the total length of the tool.

According to an important additional characteristic of the invention, the carrying element of the tool comprises a plate. The plate actually provides the tool with a remarkable bearing capacity, as well as a good capacity for covering the deposited seed.

According to a preferred embodiment, the tool is a blade.

According to another embodiment, the carrying element of the tool comprises a carrying rod constituting in particular the outside edge of the carrying element.

According to another important additional characteristic of the invention, the tool of the rotary element is flexible. Preferably, the tool is made of a flexible material. Thanks to this characteristic, the tool has a remarkable capacity for cleaning the pipe for guiding and planting seed. The covering of the deposited seed also is again improved.

In the invention, viewed along the axis of rotation of the rotary element and taking into account the direction of rotation of the rotary element, the tool extends entirely in front of the plane containing the axis of rotation of the rotary element and resting at least approximately on its outside edge.

According to an additional characteristic of the invention, the attachment part of the tool extends at least approximately tangentially to the path described by the central support of the rotary element.

Advantageously, the tool is attached to the central support in a detachable manner.

Preferably, the central support comprises, for each tool, a seat on which the attachment part of the tool rests. Advantageously, this seat comprises, at the place where the attachment part leaves the latter, a curved surface which, as viewed along the axis of rotation of the rotary element, gradually moves away from the attachment part. Thanks to this characteristic, the risks of breaking the attachment part of the tool are substantially reduced.

In practice, it has been proven that the rotary element performs its function perfectly if it comprises two to four tools per ring, at least approximately regularly spaced around its axis of rotation.

According to an additional characteristic of the invention, it is provided that the rotary element comprises two adjacent rings of tools between which, during working operation, the pipe for guiding and planting seed at least partially passes. The effectiveness of the device is thus improved since the tools are provided on both sides of the pipe.

According to an additional characteristic of the invention, the carrying structure is provided with means making possible the adjustment, in a direction at least approximately parallel to the axis of rotation of the rotary element, of the relative position between the pipe for guiding and planting seed in the soil and the corresponding lateral edges of the respective tools of the rotary element. This makes it possible to exactly adjust the distance between the pipe for guiding and planting seed in the soil and the tools for the purpose of optimal cleaning of the pipe.

According to an additional characteristic of the invention, the pipe for guiding and planting seed in the soil is connected to the carrying structure by a connecting pin directed substantially parallel to the axis of rotation of the rotary element. The lower end of the pipe thus can be displaced in height independently of the rotary element.

Preferably, forward pivoting of the lower part of the pipe for guiding and planting seed in the soil around the connecting pin is limited by a stop member. Also preferably, rearward pivoting of the lower part of the pipe for guiding and planting seed in the soil is performed in opposition to a spring. During lifting, the spring lays the pipe for guiding and planting seed in the soil against the stop and thus prevents the pipe from vibrating in transport. The stop then makes it possible to define a given low position beyond which the spring cannot displace the pipe. Thus, the pipe is prevented from assuming a position in which during the lowering of the device in the direction of the soil, it would prick the soil, causing blockage of the output orifice of the seed with the soil. Moreover, as the pivoting of the pipe is performed in opposition to a spring, the passage of the rotary element over an obstacle affects the planting depth of the seed only in a limited manner, even not at all, since the spring forces the lower end of the pipe to be displaced downward.

According to an important additional characteristic of the invention, the carrying structure is provided with means making it possible to adjust the relative position in height between the rotary element and the pipe for guiding and planting seed in the soil. The planting depth of the seed thus can be determined in a very precise manner.

According to an additional characteristic of the invention, the device for planting seed in the soil can comprise several elements for planting seed in the soil. At least one part of these various elements for planting seed in the soil can be arranged so that the axes of rotation of the rotary elements are at least approximately merged.

When the various elements for planting seed in the soil are extended so as to be very close to one another to plant seed in close rows, as is the case for planting wheat, barley, etc. . . . , it can be arranged, according to an important additional characteristic of the invention, that a pipe for guiding and planting seed extends between each pair of adjacent tool rings, and that the width of each tool is slightly smaller than the distance separating the pipes for guiding and planting seed from two adjacent elements for planting seed in the soil. In this case, actually, one of the lateral edges of the tools can help clean one of the pipes, while the other one of the lateral edges can help clean the other pipe.

In a preferred embodiment of this type of device, the rotary elements of at least one part of the various elements for planting seed in the soil are joined in the same roller. Advantageously, it will be provided that each tool ring is offset angularly around the longitudinal axis of the roller relative to the adjacent tool rings. In this manner, the corresponding tools of the various rings produce a coil around the longitudinal axis of the roller. The roller thus is driven in a regular manner and has a good bearing capacity.

According to an additional characteristic, the pipe for guiding and planting seed has a width which is at least approximately constant, at least in the part intended to pass, during working operation, close to the corresponding lateral edges of the respective tools. Its cleaning thus is easier.

The invention also relates to a seeder equipped with a device for storing seed, a device for dosing seed, a device for distributing seed, a device for planting seed in the soil as described above and a conveying device for conveying the seed from the device for dosing seed to the device for planting seed in the soil.

Finally, the invention also relates to a combined machine for working the soil and for sowing seed comprising a machine for preparing a seedbed and a seeder as described above.

BRIEF DESCRIPTION OF THE DRAWINGS

Other characteristics of the invention are contained in the other subclaims as well as in the following description of three nonlimiting embodiments of the invention made in reference to the accompanying drawing in which:

DESCRIPTION OF THE PREFERRED EMBODIMENTS

Figure 1:
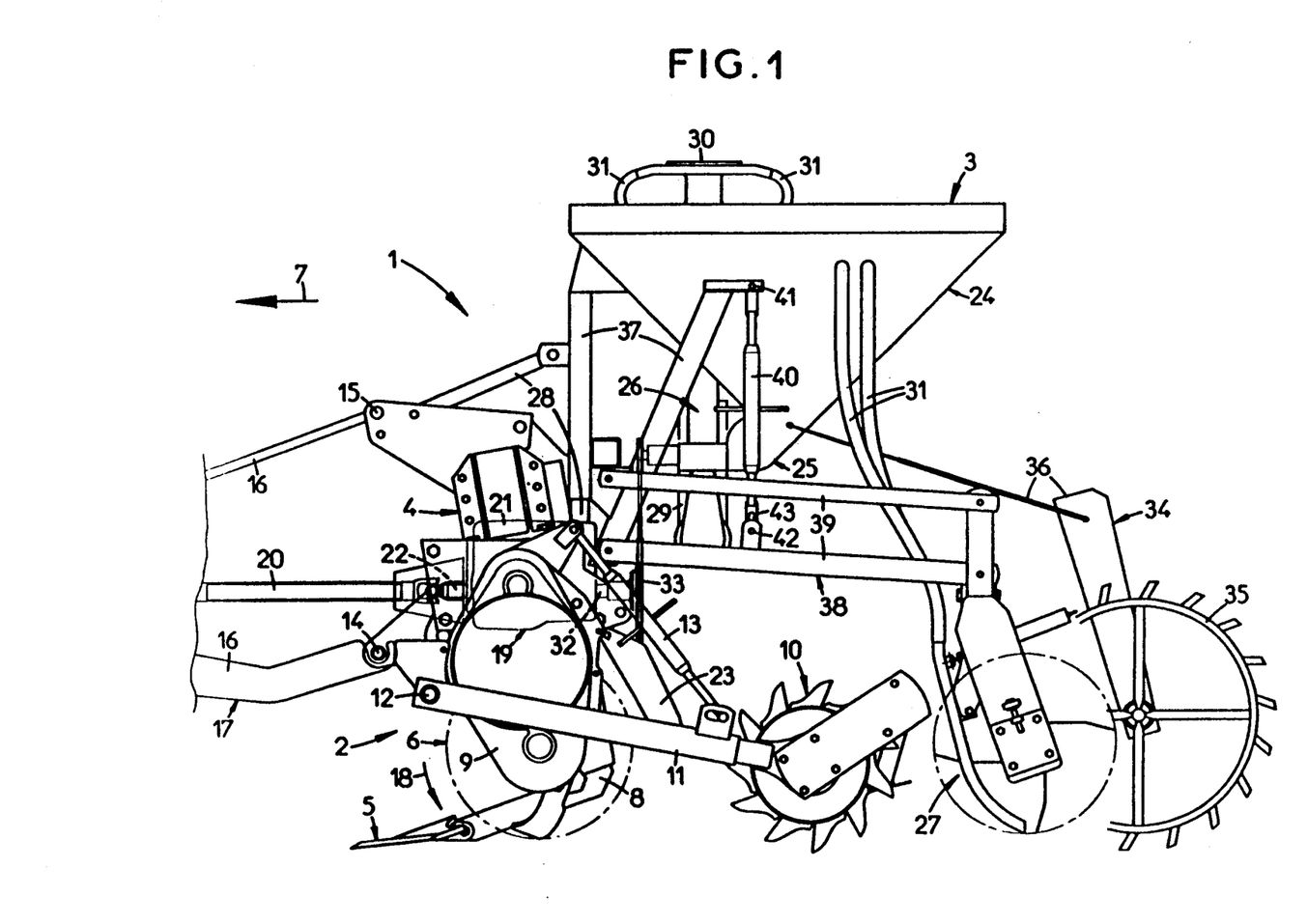
FIG. 1 is a side view of a combined machine for working the soil and for sowing seed using a device for planting seed in the soil according to the invention.

The combined machine (1) for working the soil and for sowing, shown in FIG. 1, comprises a machine (2) for preparing a seedbed and a seeder (3).

The machine for preparing a seedbed comprises a frame (4) which supports a row of shares (5) and a rotor (6). The row of shares (5) and the longitudinal axis of rotor (6) extend at least approximately perpendicular to the direction of advance (7) during working operation. Each share (5) is connected to frame (4) by a share arm (8), while rotor (6) is, in a known manner, guided in rotation in two side walls, with which frame (4) is provided. One of these side walls is made in the form of a side housing (9).

Frame (4) also supports a roller (10) arranged behind rotor (6) and whose longitudinal axis extends at least approximately parallel to the longitudinal axis of rotor (6). This roller (10), of the "Packer" type in the example shown, is rotatably guided between the rear ends of two arms (11) connected at their front end to frame (4) by a joint (12) with a pin extending at least approximately parallel to the longitudinal axis of roller (10) or rotor (6). A strut (13) of adjustable length is provided between each of these arms (11) and frame (4). Thanks to these two struts (13), it is possible to adjust the height of roller (10) relative to frame (4). During working operation, roller (10) rolls on the soil. In this manner, it determines the working depth of shares (5) and rotor (6). In addition, roller (10) participates in the working of the soil.

Frame (4) further comprises two lower hitching points (14) and an upper hitching point (15) provided for the coupling of the combined machine (1) for working the soil and for sowing with three-point hitching (16) of a farm tractor (17), of which only the connecting rods of the hitching have been shown in FIG. 1.

Rotor (6) is rotatably driven around its longitudinal axis in the direction defined by arrow (18), i.e., such that to the front, rotor (6) rotates downward. This rotational drive is achieved by drive means (19) receiving the movement of the power takeoff shaft (not shown) of farm tractor (17) by a drive shaft (20) with universal joints. The drive means (19) is known to one skilled in the art and comprise in particular a central housing (21). Central housing (21) is an angle gear housing which advantageously can be in the form of a speed box. It comprises, on one hand, an input shaft (22) connected to drive shaft (20) and, on the other hand, a lateral output shaft (not shown) which transmits the movement to side housing (9) itself transmitting the movement to rotor (6).

Frame (4) also supports a hood which extends above rotor (6) and of which only rear flap (23) can be seen in FIG. 1. This rear flap (23) is, in a known manner, angularly adjustable so as to influence the path of the earth thrown backward by rotor (6).

Seeder (3) comprises a hopper (24) in which is found the seed to be planted in the seedbed prepared by the machine for preparing a seedbed (2). At the base of hopper (24), a device for dosing seed (25) is arranged. At the output of this dosing device (25), the seed is transported by a distributing and conveying device (26) to a device (27) for planting seed in the soil which is the object of this invention and which will be described below in greater detail.

In the example shown, seeder (3) is carried by the machine (2) for preparing a seedbed. Frame (4) of the latter is equipped with a hitching structure (28) to which the seeder (3) is hitched.

This seeder (3) is a pneumatic seeder. Its distributing and conveying device (26) comprises in particular a turbine (29), a distribution head (30) and hoses (31). Turbine (29) creates the air current which conveys the seed so as to be planted in the soil. Rotatably driving of the turbine (29) is achieved by the drive means (19) of the seedbed preparing machine (2). For this purpose, central housing (21) comprises a rear output shaft (32) which drives the turbine (29) by a device with pulleys and belt (33).

Drive system (34) of dosing device (25) consists of a wheel (35) rolling on the soil and by transmission elements (36) for transmitting rotational movement from wheel (35) to dosing device (25).

In FIG. 1, it also appears that the device (27) for planting seed in the soil is connected to a frame (37) of seeder (3) by a connecting structure (38). The latter comprises two parallelograms (39) deformable in a vertical plane (actually, in FIG. 1, these two parallelograms (39) are superposed, so that only one of them is visible). Structure (38) also comprises a tie rod (40) of adjustable length extending between each parallelogram (39) and frame (37). This tie rod (40) is connected, on the one hand, to frame (37) by a joint (41) and, on the other hand, to respective parallelogram (39) by a joint (42). These joints (41, 42) both have a pin directed perpendicular to the vertical plane in which each respective parallelogram (39) is deformed. On the level of joint (42), tie rod (40) is, in addition, provided with an oblong hole (43). In this manner, the device for planting seed in the soil (27) can be adapted to the configuration of the soil in the limits allowed by oblong holes (43) of tie rods (40), this being done independently of the machine (2) for preparing a seedbed. Moreover, by being able to change the length of each tie rod (40), it is possible, for the normal working position of the device (27) for planting seed in the soil, to adjust the position of the pin of the joint (42) in oblong hole (43), whatever the working depth of the machine (2) for preparing a seedbed may be.

The device (27) for planting seed in the soil equipping seeder (3) of the combined machine (1) for working the soil and for sowing of FIG. 1 appears in detail in FIGS. 2 to 7. It consists, in general outline, of a carrying structure (44), a roller (45) and a row (46) of pipes (47) for guiding and planting seed in the soil. Carrying structure (44) comprises, first of all, a tubular crossbeam (48) whose longitudinal axis extends at least approximately perpendicular to the direction of advance (7) during working operation. This tubular crossbeam (48) is provided with an upper flange (49) and a lower flange (50). These flanges (49, 50) are at least approximately planar. They extend horizontally and parallel to the longitudinal axis of tubular crossbeam (48). At each of its ends, this tubular crossbeam (48) is, in addition, provided with a bracket (51) which extends downward and slightly backward, taking into account the direction of advance (7) during working.

Figure 2:
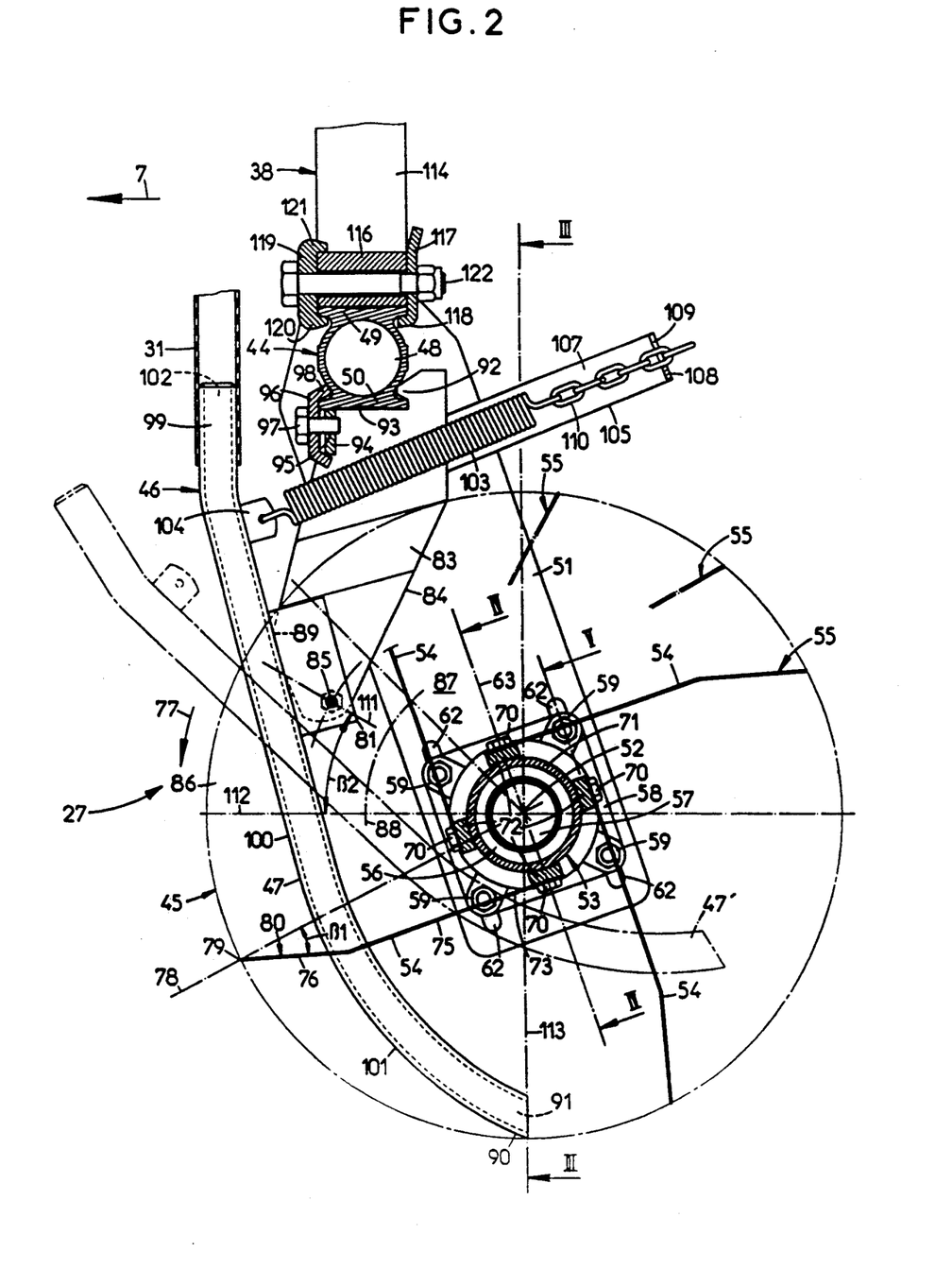
FIG. 2 is a side view of the planting device taken along plane II—II of FIG. 3.
Figure 3:
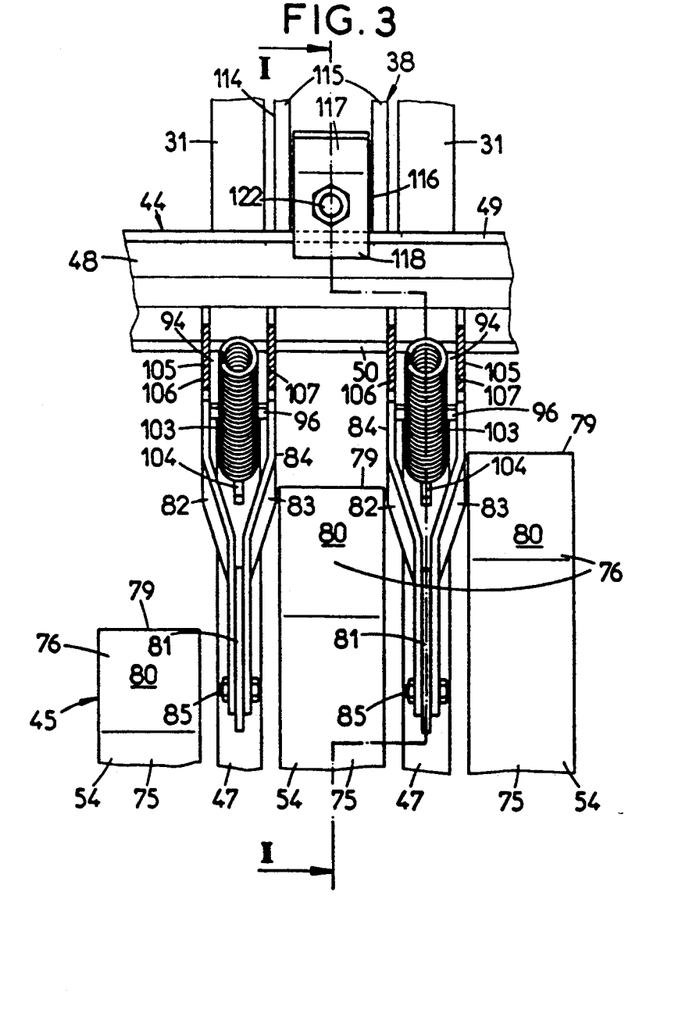
FIG. 3 shows a view in section of the planting device taken along plane III—III of FIG. 2.

Roller (45), whose longitudinal axis (52) thus is directed at least approximately perpendicular to the direction of advance (7) during working operation, extends between the free ends of these brackets (51). In this manner, the longitudinal axis of roller (45) is at least approximately parallel to the longitudinal axis of tubular crossbeam (48) of carrying structure (44).

Roller (45) consists of a central support (53) and a certain number of tools (54) distributed along rings (55) radially oriented with respect to longitudinal axis (52) and regularly spaced along the central support (53). Moreover, it also appears in FIG. 2 that a ring (55) is angularly offset around longitudinal axis (52) relative to an adjacent ring or rings (55). In the example shown, this offset is about thirty degrees. In this manner, corresponding tools (54) of various rings (55) form a coil around longitudinal axis (52) of roller (45).

Figure 5:
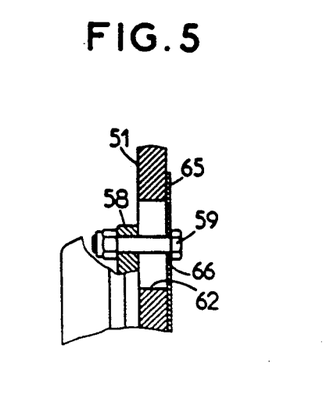
FIG. 5 shows a view of the assembly of the roller on the carrying structure taken along plane V shown in FIG. 2.

Roller (45) is guided in rotation by brackets (51) so as to be able to rotate around its longitudinal axis (501). For this purpose, central support (53) is provided at each of its ends with a flange (56) which supports a pivot (57) centered on longitudinal axis (52). Each pivot (57) is guided in rotation in a roller bearing (58) attached to respective bracket (51) by four bolts (59) and is connected in translation to bearing (58), in particular by a nut (60) screwed on its threaded end (61).

Attachment of each roller bearing (58) to a respective bracket (51) is achieved so that the position of roller (45) can be adjusted as to height. To do this, four oblong holes (62) are provided in each bracket (51) which are directed at least approximately parallel to longitudinal axis (63) of the bracket (51) and through which four respective bolts (59) pass. Also in each bracket (51), an opening (64) is provided, making possible the displacement of a respective nut (60) during adjustment of the height of roller (45). A plate (65), which comprises four holes (66) having a diameter slightly larger than the diameter of the screw of respective bolt (59), then is provided on the side of the outside face of each bracket (51). This plate (65) further is provided with a nut (67) in which is screwed an adjusting bolt (68), which can rotate without translation in a step bearing (69) attached to respective bracket (51). Thus, after having slightly loosened bolts (59), it will be sufficient to rotate adjusting bolt (68) in the direction suitable for obtaining the desired position in height of roller (45).

Actually, since each adjusting bolt (68) can rotate without translation in its step-bearing (69), its rotation will cause the displacement of respective nut (67) and plate (65). Since holes (66) provided on the plate (65) for the passage of respective bolts (59) have a diameter only slightly larger than that of the bolts (59), plate (65) will displace bolts (59) during its displacement. This displacement of bolts (59) is perfectly possible since holes (62) provided in respective bracket (51) for the passage of the bolts (59) are oblong holes. When the desired position height is reached by roller (45), it will be sufficient to retighten bolts (59).

As stated above, roller (45) consists of a certain number of tools (54) distributed along radial rings (55) regularly spaced along central support (53). In the embodiment shown, each ring (55) comprises four tools (54).

Figure 7:
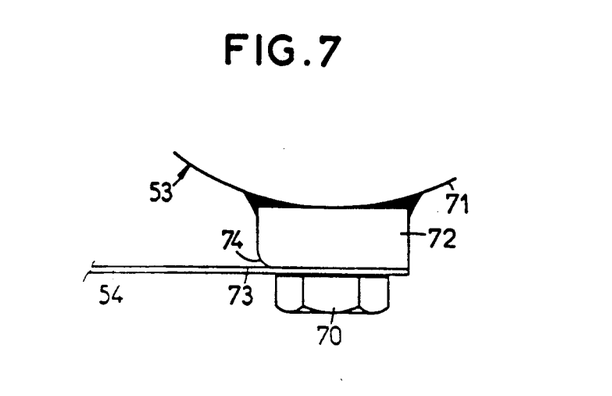
FIG. 7 shows a view along the longitudinal axis of the roller of the assembly of a tool on the central support of the roller.

Each tool (54) is attached in a removable manner to central support (53) by two bolts (70). For this purpose, central support (53) comprises a central pipe (71), which is provided, for each tool (54), with a seat (72) on which rests attachment part (73) of tool (54), which extends tangentially to the path described by central support (53). As can be seen in FIG. 7, this seat (72) comprises, in the location where attachment part (73) of respective tool (54) leaves seat (72), a curved surface (74) which, viewed along longitudinal axis (52) (axis of rotation) of roller (45), gradually moves away from the attachment part (73).

Each tool (54) then comprises an active part (75), whose outside part (76) is, viewed along longitudinal axis (52) of roller (45), straight and directed backward, taking into account the direction of rotation of roller (45) defined by arrow (77).

This outside part (76), just as, moreover, tool (54), extends, taking into account direction of rotation (77) of roller (45) in front of a plane (78) containing longitudinal axis (52) of roller (45) and resting on outside edge (79) of the outside part (76). In the example shown, outside part (76) of each tool (54) forms an angle $\beta 1$ of about 20 degrees or so with plane (78). Moreover, in the example shown, it also is seen that the length of outside part (76) is approximately equal to one third of the total length of tool (54).

In FIG. 3, each tool (54) is formed by a blade which is made of spring steel so as to have a certain flexibility. In this manner, outside part (76) comprises a carrying element (80) which has, actually, a plate shape. It is the group of all carrying elements (80) of tools (54) in contact with the soil which gives roller (45) its bearing capacity.

It also appears in FIG. 3 that outside edge (79) which is actually the outside edge of carrying element (80), is straight and is directed parallel to longitudinal axis (52) of roller (45).

As stated above, the device for planting seed in the soil (27) according to the invention also comprises a row (46) of pipes (47) for guiding and planting seed in the soil. Each pipe (47) for guiding and planting seed in the soil is connected individually, and in a jointed manner to tubular crossbeam (48) which extends, as viewed along longitudinal axis (52) of roller (45), behind the upper part of the pipes (47) and above the roller (45).

Figure 4:
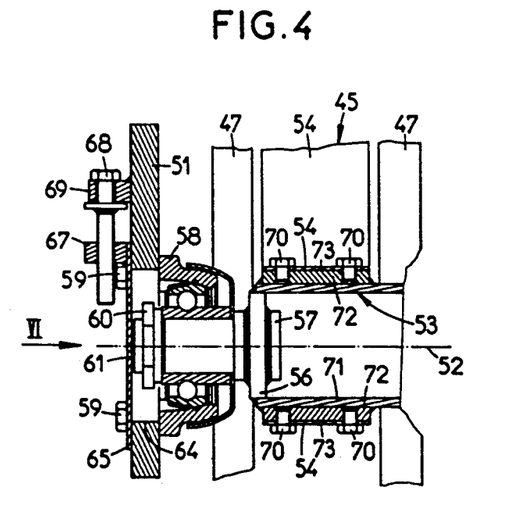
FIG. 4 shows a partial view of the planting device as taken along plane IV—IV shown in FIG. 2.

For the jointed connection, each pipe (47) for guiding and planting seed in the soil is provided at the rear, taking into account the direction of displacement (7) during working operation, with a flat bar (81) directed at least approximately perpendicular to the longitudinal axis (52) of roller (45). This flat bar (81) extends between the lower ends of two flanges (82, 83) of a support element (84) made in the form of a yoke, to which it is connected by a connecting pin (85). The two lower ends of two flanges (82, 83) of yoke (84) extend between two adjacent rings (55) of tools (54) between which a corresponding pipe (47) for guiding and planting seed in the soil extends. These lower ends of two flanges (82, 83) of yoke (84) further extend at such a distance between corresponding tools (54) of roller (45) that connecting pin (85) extends, as viewed along longitudinal axis (52) of roller (45), in an outside part (86) of front upper sector (87) of roller (45), delimited on the side of axis of rotation (52) of roller (45), along a circumference (88) with a diameter approximately equal to one half of the diameter of roller (45). Connecting pin (85), which thus extends behind the pipe (47) for guiding and planting seed in the soil, is directed so as to be at least approximately parallel to longitudinal axis (52) of roller (45). Moreover, each flange (82, 83) of yoke (84) comprises, in addition, a support face (89) against which the pipe (47) for guiding and planting seed in the soil abuts during its forward pivoting. This stop thus determines the maximum lower position of lower end (90) of pipe (47) where output orifice (91) of the seed is located.

Figure 6:
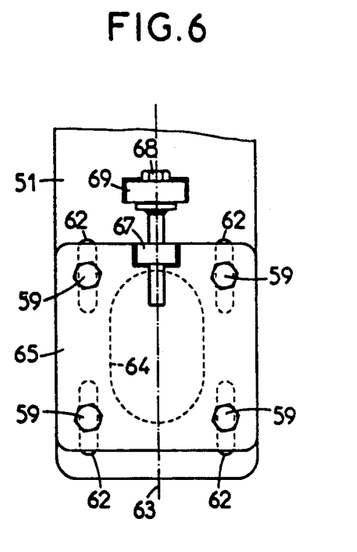
FIG. 6 shows a view of the assembly taken in the direction of arrow VI shown in FIG. 4.

While the two lower ends of two flanges (82, 83) of each yoke (84) are separated from one another by a distance slightly greater than the thickness of flat bar (81) of the pipe (47) for guiding and planting seed in the soil which extends between them, the two upper ends of the flanges (82, 83) are separated from one another by a greater distance, so as to obtain a good connection of yoke (84) with tubular crossbeam (48). This connection of each yoke (84) to tubular crossbeam (48) is achieved by a sort of dovetail arrangement. For this purpose, each flange (82, 83) of yoke (84) exhibits a tip (92) intended to be hooked on the rear edge of lower flange (50) of tubular crossbeam (48) and an at least approximately straight part (93) intended to come to rest against the lower face of the lower flange (50). A flat bar (94) provided with a threaded hole (95) is welded on the front, between two flanges (82, 83) of yoke (84). A flange (96) is attached to this flat bar (94) by a bolt (97) screwed into threaded hole (95) of the flat bar (94). This flange (96) also is provided with a tip (98) intended to be hooked on the front edge of lower flange (50) of tubular crossbeam (48). By screwing bolt (97), the lower flange (50) of tubular crossbeam (48) is tightened between two tips (92 and 98) of flanges (82, 83), respectively of flange (96). This arrangement makes it possible to adjust in an optimal manner the position of pipe (47) for guiding and planting seed in the soil relative to two corresponding rings (55) of tools (54). It is sufficient, actually, for one to loosen bolt (97), then to slide yoke (84)—pipe (47) unit in the appropriate direction along lower flange (50) of tubular crossbeam (48), until pipe (47) occupies the desired position. This position is fixed by retightening bolt (97).

Each pipe (47) for guiding and planting seed in the soil extends in front of central support (53) of roller (45) and passes between two adjacent rings (55) of tools (54). In FIG. 3, it is shown that in this embodiment, a pipe (47) for guiding and planting seed in the soil is provided between each pair of adjacent rings (55) of tools (54). It appears, in addition, that each pipe for guiding and planting seed in the soil (47) is formed by a round pipe and that it thereby has a width which is at least approximately constant. In this manner, the lateral edges of each tool (54) can pass relatively close to each respective pipe (47) for guiding and planting seed in the soil. Actually, the width of each tool (54) is slightly less than the distance separating two adjacent pipes (47) for guiding and planting seed in the soil.

Each pipe (47) for guiding and planting seed in the soil comprises, as viewed along longitudinal axis (52) of roller (45), an at least approximately straight upper part (99) extending at least approximately vertically in normal working operation, also an at least approximately straight intermediate part (100) extending rearward and downward, and a lower part (101) curved rearward. Upper part (99) comprises an input orifice (102) through which hose (47) is fed seed by a respective pipe (31) connected to the upper part (99). Lower part (101) comprises output orifice (91) extending during working operation in the soil and through which the seed is discharged.

As stated above, each pipe (47) for guiding and planting seed in the soil is connected individually to tubular crossbeam (48) by a yoke (84) and a connecting pin (85) directed at least approximately parallel to longitudinal axis (52) of roller (45). In this manner, the pipe (47) can pivot relative to carrying structure (44) and relative to roller (45) in a plane at least approximately vertical and at least approximately perpendicular to longitudinal axis (52) of roller (45), in particular to withdraw from the soil in case of encountering an obstacle. This pivoting is performed in opposition to a spring (103) which is, in the example shown, a draw spring. For this purpose, pipe (47) for guiding and planting seed in the soil is provided with a hooking lug (104) extending higher than flat bar (81). Two flanges (82, 83) of yoke (84) are provided to the rear with a hooking part (105) having, in plan view, a U-shape. This hooking part (105) is welded at each free end of its two wings (106, 107) to a respective flange (82, 83) of yoke (84). A groove (109) is provided on the base (108) of hooking part (105). Thanks to this arrangement, spring (103), which extends higher than connecting pin (85) and at least approximately in the same plane as pipe (47), is hooked at one of its ends to hooking lug (104), passes between the upper ends of two flanges (82, 83) of yoke (84) and under tubular crossbeam (48) and is hooked at the other one of its ends to base (108) of hooking part (105) by a small chain (110) one of whose links is inserted into groove (109) made in the base (108). To adjust the return force exerted by spring (103) on a respective pipe (47), it will be sufficient to insert another link of small chain (110) in groove (109).

As stated above, connecting pin (85) extends into outside part (86) of front upper sector (87) of roller (45). In the embodiment shown, the connecting pin (85) is on a radius (111) forming, with horizontal plane (112) passing through longitudinal axis (52) of roller (45), an angle β2 of about thirty degrees and at a distance from longitudinal axis (52) of roller (45) equal to about one third of the value of the diameter of roller (45) which is about fifty centimeters. Central support (53) has a diameter of about one fifth of the diameter of roller (45). Thus, output orifice (91) of pipe (47) which extends, in the lowest position, approximately in vertical plane (113) passing through longitudinal axis (52) of roller (45), has a correct vertical clearance (47) of about ten centimeters ((47') and designates a pipe for guiding and planting seed in its maximum height position).

The connection of the device (27) for planting seed in the soil to two parallelograms (39) is achieved in the following manner. Each parallelogram (39) is provided at the rear with a standard (114) comprising at its lower end a fork (115) in which is welded a flat iron (116), intended in particular to come into contact with the upper face of upper flange (49) of tubular crossbeam (48). A stationary jaw (117), which comprises a tip (118) intended to be hooked to the rear edge of upper flange (49) of tubular crossbeam (48), is welded to the rear of fork (115). A removable jaw (119), which exhibits a lower tip (120) and an upper tip (121), extends to the front. Lower tip (120) is intended to be hooked on the front edge of upper flange (49) of tubular crossbeam (48), while upper tip (121) is intended to be hooked on flat iron (116). A bolt (122) finally passing all the way through stationary jaw (117), flat iron (116) and removable jaw (119), tightens upper flange (49) of tubular crossbeam (48) between tip (118) of stationary jaw (117) and lower tip (120) of removable jaw (119).

Device (27) for planting seed in the soil described above operates in the following manner.

Thanks to the jointed connection by parallelogram (39) and to roller (45) whose tools (54) are provided on their outside part (76) with a carrying element (80), the depth for planting seed is controlled by device (27) itself. By pulling device (27) in the direction (7) of displacement during working operation, carrying elements (80) of various tools (54) come into contact with the soil. Since tools (54) are placed on roller (45) in coils, rotational driving of roller (45) is performed in a regular manner. It is thereby assured that roller (45) perfectly guides pipes (47), since at each moment, there are several tools (54) in contact with the soil.

By rotating, the tools (54) pass between the pipes (47) for guiding and planting seed in the soil and move away the plant debris which comes in contact with the pipes (47). Concurrently, tools (54) also prevent the formation of accumulations of earth between two adjacent pipes (47).

Taking into account the special shape of outside edge (79) of each tool (54), the tools (54) are prevented from piercing in particular the plant debris and carrying the latter during their rotation.

To the rear, when the tools (54) leave the earth, they take away a small amount of the earth which will immediately fall again and cover the furrows produced by adjacent pipes (47) to cover the seed deposited at the bottom of these furrows by the pipes (47).

The depth for planting seed can be adjusted in a very precise manner. It is sufficient, actually, for this purpose to adjust the position in height of roller (45) relative to carrying structure (44). By so doing, the relative position between pipes (47) and roller (45) is modified since the pipes (47) are not displaced during this adjustment.

The pipes (47) are connected individually in a jointed manner to carrying structure (44). As a result, lower part (101) of each pipe (47) can be displaced with respect to height independently of other pipes (47) and roller (45). A pipe (47) thus can pass above a rock buried in the soil without the working depth of other pipes (47) being modified. Taking into account the position of connecting pin (85), it has been possible to obtain a good vertical course.

Moreover, since pivoting of each pipe (47) is performed in opposition to a spring (103), the passage of roller (45) over an obstacle modifies only in a limited manner, even not at all, the depth for planting seed in the soil, since spring (103) forces lower part (101) of the corresponding pipe (47) to be displaced downward.

Taking into account the special arrangement of tubular crossbeam (48) behind upper part (99) of pipes (47) and above roller (45), and of yoke (84), spring (103) and connecting pin (85) behind corresponding pipe (47), a relatively compact device (27) for planting seed in the soil is obtained. In this manner, the latter easily can be arranged directly behind roller (10) of the machine for preparing a seedbed (2).

Each unit formed by a pipe for guiding and planting seed in the soil (47), the corresponding part of carrying structure (44) and the corresponding part of roller (45), constitutes an element for planting seed in the soil.

While all these planting elements are connected to one another in the example described, it will be understood that it is possible, within the scope of the invention, to have independent planting elements.

In the example described, the pipes (47) for guiding and planting seed in the soil extend very close to one another for the sowing of wheat, barley, etc. It will be understood, however, that for sowing seed in more separated rows, it is possible to produce a device (27) whose various pipes (47) are more widely separated from one another. It is also perfectly possible to sow separated rows with a device (27) provided for sowing in close rows. It is sufficient, actually, for this purpose to eliminate the supply of some pipes (47). It is, moreover, possible to remove pipes (47) not supplied.

Within the scope of the invention, the machine for preparing a seedbed (2) and seeder (3) can be different from those described.

Figure 8:
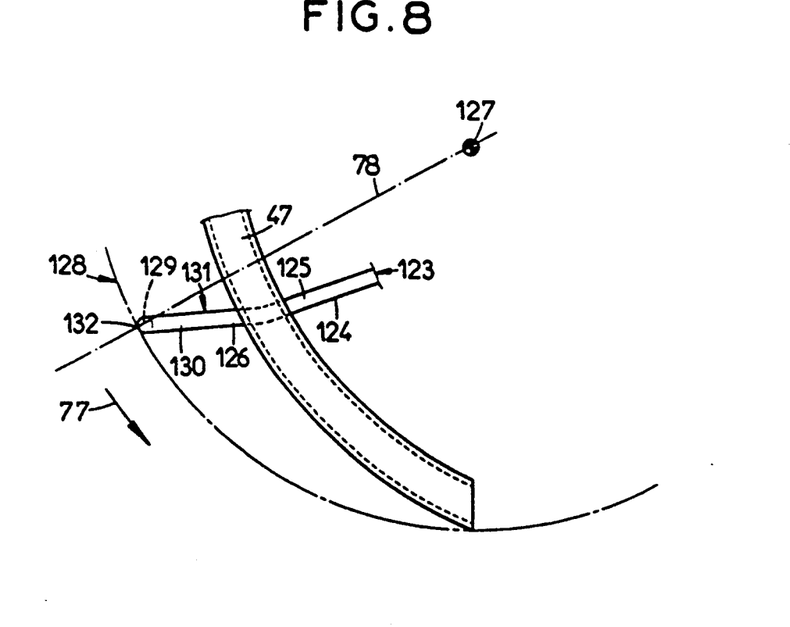
FIG. 8 shows a partial side view of the device for planting seed in the soil equipped with tools according to a second embodiment.
Figure 9:
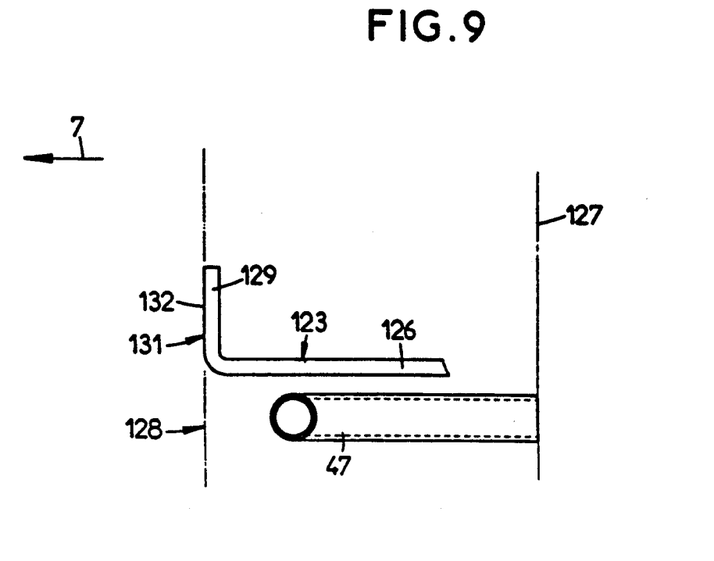
FIG. 9 shows a plan view of the outside part of a tool according to the second embodiment.

Finally, it is perfectly possible that the device (27) for planting seed in the soil can equip a seeder (3) used solo. Tool (123), shown in FIGS. 8 and 9, is formed by a rod (124) with a round section whose active part (125) consists of an arm (126) extending at least approximately radially relative to longitudinal axis (127) (i.e., axis of rotation) of roller (128), and an arm (129) extending at the free end of arm (126) and directed at least approximately parallel to longitudinal axis (127) of roller (128). Just as for tool (54) of the preceding example, an outside part (130) of active part (125) is, as viewed along longitudinal axis (127) of roller (128), straight and directed rearward, taking into account the direction of rotation of roller (128) defined by arrow (77). The straight outside part of radial arm (126) and arm (129) (carrying rod) form carrying element (131) of tool (123). Moreover, it appears that the outside edge (132) of tool (123), which, actually, consists of a generatrix of arm (129), is directed at least approximately parallel to the longitudinal axis (127) of roller (128) so that tool (123) cannot prick the plant debris which is on the soil. This tool (123) is mounted on roller (128) so that radial arm (126) passes, during the rotation of roller (128), close to corresponding pipe for guiding and planting seed in the soil (47) and so that arm (129) moves away from the pipe (47).

Figure 10:
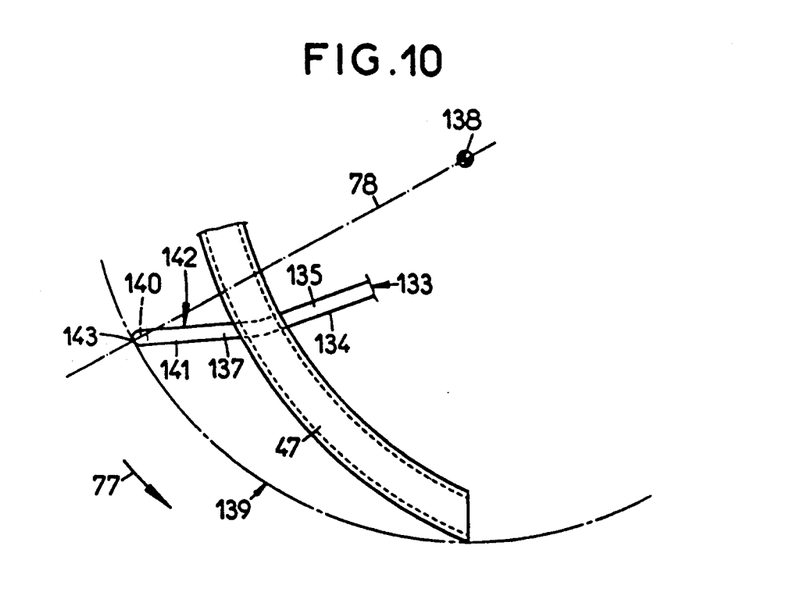
FIG. 10 shows a partial side view of the device for planting seed in the soil equipped with tools according to a third embodiment.
Figure 11:
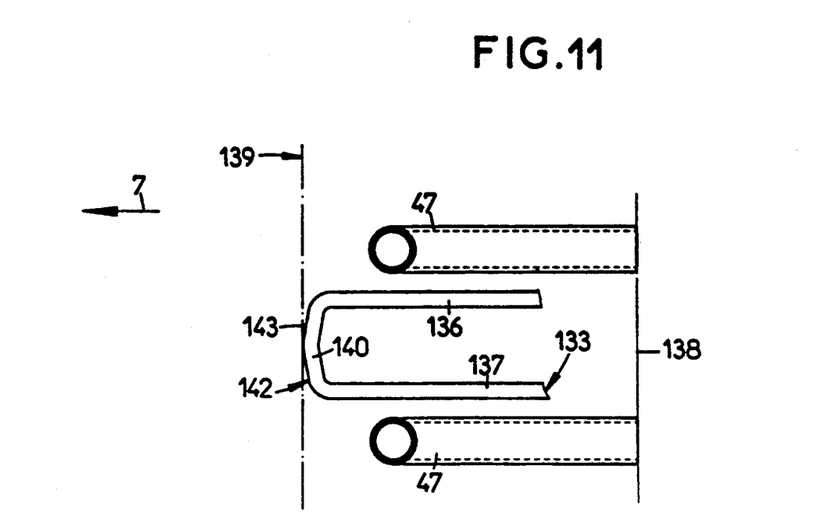
FIG. 11 shows a plan view of the outside part of a tool according to the third embodiment.

Tool (133), shown in FIGS. 10 and 11, also is formed by a rod (134) with a round section, whose active part (135) consists of two arms (136, 137) extending at least approximately radially relative to longitudinal axis (138) (i.e., axis of rotation ) of roller (139) and an arm (140) connecting the free end of two radial arms (136, 137) and directed essentially crosswise to the direction of advance (7) during working operation. In plan view, tool (133) thus has a general U shape, whose arm (140) forms the base. Outside part (141) of active part (135) is, as viewed along longitudinal axis (138) of roller (139), straight and directed rearward, taking into account the direction of rotation of roller (139) defined by arrow (77). The straight outside part of radial arms (136, 137) and arm (140) (carrying rod) form carrying element (142) of tool (133). Moreover, it appears that outside edge (143) of tool (133), which actually consists of a generatrix of arm (140), is directed essentially crosswise to direction of advance (7) during working operation, so that tool (133) cannot prick the plant debris which is on the soil. In FIG. 11, it also appears that the width of tool (133) is slightly smaller than the distance between two adjacent pipes for guiding and planting seed in the soil (47).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for planting seed in the soil which comprises at least one element for planting seed in the soil, said element including:
    a carrying structure;
    a rotary element guided in rotation on said carrying structure so as to rotate around an axis of rotation which extends crosswise to a direction of advance during working operation of said device, said rotary element comprising a central support and a plurality of tools attached to said central support in at least one ring oriented substantially radially with respect to said axis of rotation of said rotary element; and
    a pipe for guiding and planting seed in the soil, said pipe extending in front of said central support of said rotary element and respectively passing, during working operation, in proximity to a corresponding lateral edge of said tools of said rotary element;
    wherein at least one of said tools comprises an active part having an outside part located away from said central support of said rotary element, and wherein said outside part:
    - comprises a carrying element having an outside edge away from said central support and directed essentially crosswise to said direction of advance during working operation, and
    - extends, as viewed along said axis of rotation of said rotary element and taking into account a direction of rotation of said rotary element, in front of a plane containing said axis of rotation of said rotary element and resting at least approximately on said outside edge of said carrying element.

2. A device for planting seed in the soil according to claim 1, wherein said axis of rotation of said rotary element extends at least approximately perpendicular to said direction of advance during working operation.

3. A device for planting seed in the soil according to claim 1, wherein said outside edge of said carrying element of said at least one tool is directed at least approximately horizontally and at least approximately perpendicular to said direction of advance during working operation.

4. A device for planting seed in the soil according to claim 1, wherein said outside edge of said carrying element of said at least one tool is at least approximately straight.

5. A device for planting seed in the soil according to claim 1, wherein, as viewed along said axis of rotation of said rotary element, said outside part of said active part of said at least one tool forms with said plane containing said axis of rotation and resting at least approximately on said outside edge of said carrying element of said tool, an angle of a value between 15° and 45°.

6. A device for planting seed in the soil according to claim 1, wherein, as viewed along said axis of rotation of said rotary element, said outside part of said active part of said at least one tool is at least approximately straight.

7. A device for planting seed in the soil according to claim 6, wherein said at least approximately straight outside part has a length of approximately between one fourth and one third of a total length of said at least one tool.

8. A device for planting seed in the soil according to claim 1, wherein said carrying element of said at least one tool comprises a plate.

9. A device for planting seed in the soil according to claim 8, wherein said at least one tool comprises a blade.

10. A device for planting seed in the soil according to claim 1, wherein said carrying element of said at least one tool includes a carrying rod which comprises an outside edge of said carrying element.

11. A device for planting seed in the soil according to claim 10, wherein said at least one tool comprises a rod having an arm extending approximately radially with respect to said axis of rotation of said rotary element and which, during rotation of said rotary element, passes close to said pipe for guiding and planting seed in the soil, and wherein an arm extends at a free end of the radial arm so as to move away from said pipe and which comprises said carrying rod.

12. A device for planting seed in the soil according to claim 10, wherein said at least one tool comprises a rod having, in plan view, a general U shape, said rod including two arms extending substantially radially with respect to said axis of rotation of said rotary element and wherein one of said arms is mounted so as to pass close to said pipe for guiding and planting seed in the soil during rotation of said rotary element, and a third arm connects two free ends of the radial arms to one another and comprises the carrying rod.

13. A device for planting seed in the soil according to claim 1, wherein said at least one tool of said rotary element comprises a flexible tool.

14. A device for planting seed in the soil according to claim 13, wherein said at least one tool comprises a flexible material tool.

15. A device for planting seed in the soil according to claim 13, wherein said at least one tool comprises a spring steel tool.

16. A device for planting seed in the soil according to claim 1, wherein, as viewed along said axis of rotation of said rotary element and taking into account said direction of rotation of said rotary element, said at least one tool extends entirely in front of said plane containing said axis of rotation and resting at least approximately on said outside edge.

17. A device for planting seed in the soil according to claim 1, wherein said at least one tool comprises an attachment part which extends at least approximately tangentially to a path defined by said central support of said rotary element.

18. A device for planting seed in the soil according to claim 1, wherein said at least one tool is removably attached to said central support of said rotary element.

19. A device for planting seed in the soil according to claim 1, wherein for each of said tools, said central support of said rotary element comprises a seat on which an attachment part of said tool rests, and wherein at a location where said attachment part leaves said seat, said seat comprises a curved surface which, as viewed along said axis of rotation of said rotary element, gradually moves away from said attachment part.

20. A device for planting seed in the soil according to claim 1, wherein said rotary element comprises two to four tools per ring at least approximately regularly spaced around said axis of rotation of said rotary element.

21. A device for planting seed in the soil according to claim 1, wherein said rotary element comprises two adjacent rings of tools between which, during working operation, said pipe for guiding and planting seed in the soil at least partially passes.

22. A device for planting seed in the soil according to claim 1, wherein said carrying structure includes means for adjusting, in a direction at least approximately parallel to said axis of rotation of said rotary element, the relative position between said pipe for guiding and planting seed in the soil and corresponding lateral edges of respective tools of said rotary element.

23. A device for planting seed in the soil according to claim 1, wherein said pipe for guiding and planting seed in the soil is connected to said carrying structure by a connecting pin which is directed at least approximately parallel to said axis of rotation of said rotary element.

24. A device for planting seed in the soil according to claim 23, which comprises stop means for limiting forward pivoting of a lower part of said pipe for guiding and planting seed in the soil around said connecting pin.

25. A device for planting seed in the soil according to claim 23, which comprises spring means for performing rearward pivoting of a lower part of said pipe for guiding and planting seed in the soil in opposition to said spring means.

26. A device for planting seed in the soil according to claim 1, wherein said carrying structure includes means for adjusting the relative height position between said rotary element and said pipe for guiding and planting seed in the soil.

27. A device for planting seed in the soil according to claim 1, wherein said device for planting seed in the soil comprises a plurality of elements for planting seed in the soil.

28. A device for planting seed in the soil according to claim 27, wherein at least some of said plurality of elements for planting seed in the soil are arranged such that said axis of rotation of said corresponding rotary elements are at least substantially merged.

29. A device for planting seed in the soil according to claim 28, wherein a pipe for guiding and planting seed in the soil is located between each pair of adjacent rings of tools, and wherein the width of each tool is slightly smaller than a distance separating the pipes for guiding and planting seed in the soil of two adjacent elements for planting seed in the soil.

30. A device for planting seed in the soil according to claim 28, wherein said rotary element corresponding to at least some of said plurality of elements for planting seed in the soil are joined in a roller.

31. A device planting seed in the soil according to claim 30, wherein each ring of tools is offset angularly around a longitudinal axis of said roller relative to adjacent rings of the tools.

32. A device for planting seed in the soil according to claim 1, wherein said pipe for guiding and planting seed in the soil comprises at least in a part thereof which, during working operation, extends close to corresponding lateral edges of respective tools, a width dimension which is at least substantially constant.

33. A seeder apparatus which comprises:
   (a) a device for storing seed;
   (b) a device for dosing seed;
   (c) a device for distributing seed;
   (d) a device for planting seed in the soil;
   (e) a device for conveying seed from said device for dosing seed to said device for planting seed in the soil;
   wherein said device for planting seed in the soil comprises at least one element for planting seed in the soil, said element including:
   (i) a carrying structure;
   (ii) a rotary element guided in rotation on said carrying structure so as to rotate around an axis of rotation which extends crosswise to a direction of advance during working operation of said device, said rotary element comprising a central support and a plurality of tools attached to said central support in at least one ring oriented substantially radially with respect to said axis of rotation of said rotary element; and
   (iii) a pipe for guiding and planting seed in the soil, said pipe extending in front of said central support of said rotary element and respectively passing, during working operation, in proximity to a corresponding lateral edge of said tools of said rotary element;
   wherein at least one of said tools comprises an active part having an outside part located away from said central support of said rotary element, and wherein said outside part:
   comprises a carrying element having an outside edge positioned away from said central support and directed essentially crosswise to said direction of advance during working operation, and
   extends, as viewed along said axis of rotation of said rotary element and taking into account a direction of rotation of said rotary element, in front of a plane containing said axis of rotation of said rotary element and resting at least approximately on said outside edge of said carrying element.

34. A seeder apparatus according to claim 33, wherein said axis of rotation of said rotary element extends at least approximately perpendicular to said direction of advance during working operation.

35. A seeder apparatus according to claim 33, wherein said outside edge of said carrying element of said at least one tool is directed at least approximately horizontally and at least approximately perpendicular to said direction of advance during working operation.

36. A seeder apparatus according to claim 33, wherein said outside edge of said carrying element of said at least one tool is at least approximately straight.

37. A seeder apparatus according to claim 33, wherein, as viewed along said axis of rotation of said rotary element, said outside part of said active part of said at least one tool forms with said plane containing said axis of rotation and resting at least approximately on said outside edge of said carrying element of said tool, an angle of a value between 15° and 45°.

38. A seeder apparatus according to claim 33, wherein as viewed along said axis of rotation of said rotary element, said outside part of said active part of said at least one tool is at least approximately straight.

39. A seeder apparatus according to claim 33, wherein said carrying element of said at least one tool comprises a plate.

40. A seeder apparatus according to claim 39, wherein said at least one tool comprises a blade.

41. A seeder apparatus according to claim 33, wherein said carrying element of said at least one tool comprises a carrying rod which comprises an outside edge of said carrying element.

42. A seeder apparatus according to claim 33, wherein said at least one tool of said rotary element comprises a flexible tool.

43. A seeder apparatus according to claim 33, wherein, as viewed along said axis of rotation of said rotary element and taking into account said direction of rotation of said rotary element, said at least one tool extends entirely in front of said plane containing said axis of rotation and resting at least approximately on said outside edge.

44. A seeder apparatus according to claim 33, wherein said at least one tool is removably attached to said central support of said rotary element.

45. A seeder apparatus according to claim 33, wherein said rotary element comprises from two to four tools per ring at least approximately regularly spaced around said axis of rotation of said rotary element.

46. A seeder apparatus according to claim 33, wherein said rotary element comprises two adjacent rings of tools between which, during working operation, said pipe for guiding and planting seed in the soil at least partially passes.

47. A seeder apparatus according to claim 33, wherein said carrying structure includes means for adjusting, in a direction at least approximately parallel to said axis of rotation of said rotary element, the relative position between said pipe for guiding and planting seed in the soil and corresponding lateral edges of respective tools of said rotary element.

48. A seeder apparatus according to claim 33, wherein said pipe for guiding and planting seed in the soil is connected to said carrying structure by a connecting pin which is directed at least approximately parallel to said axis of rotation of said rotary element.

49. A seeder apparatus according to claim 48, which comprises stop means for limiting forward pivoting of a lower part of said pipe for guiding and planting seed in the soil around said connecting pin.

50. A seeder apparatus according to claim 48, which comprises spring means for performing a rearward pivoting of a lower part of said pipe for guiding and planting seed in the soil in opposition to said spring means.

51. A seeder apparatus according to claim 33, wherein said carrying structure includes means for adjusting the relative height position between said rotary element and said pipe for guiding and planting seed in the soil.

52. A seeder apparatus according to claim 33, wherein said device for planting seed in the soil comprises a plurality of elements for planting seed in the soil.

53. A seeder apparatus for according to claim 52, wherein at least some of said plurality of elements for planting seed in the soil are arranged such that said axis of rotation of said corresponding rotary elements are at least substantially merged.

54. A seeder apparatus according to claim 53, wherein a pipe for guiding and planting seed in the soil is located between each pair of adjacent rings of tools, and wherein the width of each tool is slightly smaller than a distance separating the pipes for guiding and planting seed in the soil of two adjacent elements for planting seed in the soil.

55. A seeder apparatus according to claim 53, wherein said rotary elements of at least some of said plurality of elements for planting seed in the soil are joined in a roller.

56. A seeder apparatus according to claim 55, wherein each ring of tools is offset angularly around a longitudinal axis of said roller relative to adjacent rings of tools.

57. A combined machine for working the soil and for sowing seed, comprising:
 (a) a farm machine for preparing a seedbed;
 (b) a seeder apparatus connected to said farm machine and equipped with a device for planting seed in the soil;
 (c) said device for planting seed in the soil comprises at least one element for planting seed in the soil, said element including:
  (i) a carrying structure;
  (ii) a rotary element guided in rotation on said carrying structure so as to rotate around an axis of rotation which extends crosswise to a direction of advance during working operation of said device, said rotary element comprising a central support and a plurality of tools attached to said central support in at least one ring oriented substantially radially with respect to said axis of rotation of said rotary element; and
  (iii) a pipe for guiding and planting seed in the soil, said pipe extending in front of said central support of said rotary element and respectively passing, during working operation, in proximity to a corresponding lateral edge of said tools of said rotary element;
wherein at least one of said tools comprises an active part having an outside part located away from said central support of said rotary element, and wherein said outside part;
 - comprises a carrying element having an outside edge away from said central support and directed essentially crosswise to said direction of advance during working operation, and
- extends, as viewed along said axis of rotation of said rotary element and taking into account a direction of rotation of said rotary element in front of a plane containing said axis of rotation of said rotary element and resting at least approximately on said outside edge of said carrying element.

58. A combined machine for working the soil and for sowing seed according to claim 57, wherein said axis of rotation of said rotary element extends at least approximately perpendicular to said direction of advance during working operation.

59. A combined machine for working the soil and for sowing seed according to claim 57, wherein said outside edge of said carrying element of said at least one tool is directed at least approximately horizontally and at least approximately perpendicular to said direction of advance during working operation.

60. A combined machine for working the soil and for sowing seed according to claim 57, wherein said outside edge of said carrying element of said at least one tool is at least approximately straight.

61. A combined machine for working the soil and for sowing seed according to claim 57, wherein, as viewed along said axis of rotation of said rotary element, said outside part of said active part of said at least one tool forms with said plane containing said axis of rotation and resting at least approximately on said outside edge of said carrying element of said tool, an angle of a value between 15° and 45°.

62. A combined machine for working the soil and for sowing seed according to claim 57, wherein, as viewed along said axis of rotation of said rotary element, said outside part of said active part of said at least one tool is at least approximately straight.

63. A combined machine for working the soil and for sowing seed according to claim 57, wherein said carrying element of said least one tool comprises a plate.

64. A combined machine for working the soil and for sowing seed according to claim 63, wherein said at least one tool comprises a blade.

65. A combined machine for working the soil and for sowing seed according to claim 57, wherein said carrying element of said at least one tool comprises a carrying rod which comprises an outside edge of said carrying element.

66. A combined machine for working the soil and for sowing seed according to claim 57, wherein said at least one tool of said rotary element is flexible.

67. A combined machine for working the soil and for sowing seed according to claim 57, wherein, as viewed along said axis of rotation of said rotary element and taking into account said direction of rotation of said rotary element, said at least one tool extends entirely in front of said plane containing said axis of rotation for resting at least approximately on said outside edge.

68. A combined machine for working the soil and for sowing seed according to claim 57, wherein said at least one tool is removably attached to said central support of said rotary element.

69. A combined machine for working the soil and for sowing seed according to claim 57, wherein said rotary element comprises two to four tools per ring at least approximately regularly spaced around said axis of rotation of said rotary element.

70. A combined machine for working the soil and for sowing seed according to claim 57, wherein said rotary element comprises two adjacent rings of tools between which, during working operation, said pipe for guiding and planting seed in the soil at least partially passes.

71. A combined machine for working the soil and for sowing seed according to claim 57, wherein said carrying structure includes means for adjusting, in a direction at least approximately parallel to said axis of rotation of said rotary element, the relative position between said pipe for guiding and planting seed in the soil and corresponding lateral edges of respective tools of said rotary element.

72. A combined machine for working the soil and for sowing seed according to claim 57, wherein said pipe for guiding and planting seed in the soil is connected to said carrying structure by a connecting pin which is directed at least approximately parallel to said axis of rotation of said rotary element.

73. A combined machine for working the soil and for sowing seed according to claim 72, which comprises stop means for limiting forward pivoting of a lower part of said pipe for guiding and planting seed in the soil around said connecting pin.

74. A combined machine for working the soil and for sowing seed according to claim 72, which comprises spring means for performing rearward pivoting of a lower part of said pipe for guiding and planting seed in the soil in opposition to said spring means.

75. A combined machine for working the soil and for sowing seed according to claim 57, wherein said carrying structure includes means for adjusting the relative height position between said rotary element and said pipe for guiding and planting seed in the soil.

76. A combined machine for working the soil and for sowing seed according to claim 57, wherein said device for planting seed in the soil comprises a plurality of elements for planting seed in the soil.

77. A combined machine for working the soil and for sowing seed according to claim 76, wherein at least some of said plurality of elements for planting seed in the soil are arranged such that said axis of rotation of said corresponding rotary elements are at least substantially merged.

78. A combined machine for working the soil and for sowing seed according to claim 77, wherein a pipe for guiding and planting seed in the soil is located between each pair of adjacent rings of tools, and wherein the width of each tool is slightly smaller than a distance separating the pipes for guiding and planting seed in the soil of two adjacent elements for planting seed in the soil.

79. A combined machine for working the soil and for sowing seed according to claim 77, wherein said rotary elements of at least some of said plurality of elements for planting seed in the soil are joined in a roller.

80. A combined machine for working the soil and for sowing seed according to claim 79, wherein each ring of tools is offset angularly around a longitudinal axis of said roller relative to adjacent rings of tools.

* * * * *